United States Patent [19]

Ohkawa et al.

[11] 4,417,011
[45] Nov. 22, 1983

[54] RESIN COMPOSITION FOR BONDING FOUNDRY SAND

[75] Inventors: Koue Ohkawa, Yokohama; Shin Fujii, Zama; Takashi Seino, Yokosuka, all of Japan

[73] Assignee: Mitsui Toatsu Chemicals, Inc., Tokyo, Japan

[21] Appl. No.: 474,683

[22] Filed: Apr. 1, 1983

Related U.S. Application Data

[63] Continuation of Ser. No. 154,930, May 30, 1980.

[30] Foreign Application Priority Data

Jun. 7, 1979 [JP]  Japan .................................. 54-70621

[51] Int. Cl.$^3$ .............................................. C08K 3/36
[52] U.S. Cl. ................................................... 523/527
[58] Field of Search ........................................ 523/527

[56] References Cited

U.S. PATENT DOCUMENTS

| 2,634,251 | 4/1953 | Kass | 528/194 |
|---|---|---|---|
| 2,904,533 | 9/1959 | Carlston et al. | 528/304 |
| 3,196,131 | 7/1965 | Mayer et al. | 528/301 |
| 3,252,941 | 5/1966 | Mayer et al. | 528/301 |
| 3,555,051 | 1/1971 | Marsden et al. | 260/42.15 |
| 3,649,320 | 3/1972 | Yates | 260/42.15 |
| 3,652,470 | 3/1972 | Zimmerman et al. | 523/514 |
| 3,923,927 | 12/1975 | Miyake et al. | 528/304 |
| 4,162,245 | 7/1979 | Collins et al. | 523/514 |

FOREIGN PATENT DOCUMENTS 51-29318  3/1976  Japan .

*Primary Examiner*—V. P. Hoke
*Attorney, Agent, or Firm*—Fisher, Christen & Sabol

[57] ABSTRACT

A resin composition for bonding of foundry sand, said composition comprising as a resin component a crystalline unsaturated polyester being solid and substantially tack-free at room temperature and having an acid value of 15 to 100, said unsaturated polyester being prepared by polymerizing (A) a dicarboxylic acid component containing 10 to 50 mole % of terephthalic acid, an alkyl terephthalate, isophthalic acid or an alkyl isophthalate and 50 to 90 mole % of fumaric acid and (B) a glycol component containing at least 90 mole % of ethylene glycol, trimethylene glycol, neopentyl glycol, hydrogenated bisphenol A or 2,2-d-(4-hydroxypropoxyphenyl)propane.

4 Claims, 1 Drawing Figure

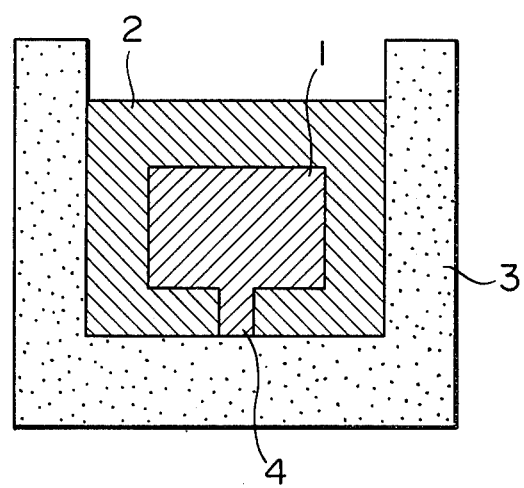

RESIN COMPOSITION FOR BONDING FOUNDRY SAND

This is a continuation of application Ser. No. 154,930, filed May 30, 1980.

BACKGROUND OF THE INVENTION

1. Field of the Invention

This invention relates to a resin composition for making cores or molds by bonding foundry sand.

2. Description of the Prior Art

Phenolic resins are now in widespread use as sand binders in the production of foundry molds. These resins, however, pose a problem of environmental pollution because when heated during coating of sand, molding or pouring, they give off toxic or malodorous gases. When a phenolic resin-coated sand is used in making a core for casting an aluminum alloy, the disintegrability of the core is very poor. Specifically, the heat (650°-750° C.) of the molten metal after casting causes hardening of the phenolic resin at a thick portion of the inside of the core so that this portion attains an increased strength. On the other hand, a thin portion of the core is placed in an oxygen-free condition when surrounded by the molten metal. Hence, the benzene ring of the phenolic ring mainly undergoes carbonization to cause bonding between said particles or between the sand particles and the aluminum alloy casting, and therefore, the strength of the thick portion scarcely decreases. In the production of an aluminum alloy casting using a core of a complicated profile made by phenolic resin-coated sand, therefore, it is usual to facilitate disintegration of molds and cores by a shake-out machine by preliminarily baking the mold assemblies containing castings for a period of as long as 4 to 10 hours at 400° to 500° C. It is thus not always desirable to use a phenolic resin as a resin component of a resin composition for bonding of foundry sand.

SUMMARY OF THE INVENTION

As stated hereinabove, a mold or core as made by using a resin composition for bonding foundry sand should have sufficient strength, and be easily knocked out after use. In addition to these properties, it is required that sand particles coated with the resin composition should not adhere to each other at room temperature and atmospheric pressure, and that the resin composition should be solid and substantially tack-free at room temperature and have a low viscosity at a temperature above its softening point so that it can coat sand particles sufficiently at an elevated temperature. However, no resin composition which meets all of these requirements has been developed to date.

It is an object of this invention to provide a resin composition for bonding of foundry sand, which meets the aforesaid requirements and is free from the aforesaid defects of phenolic resins.

It has now been found that a certain specified unsaturated polyester meets this object.

According to this invention, there is provided a resin composition for bonding of foundry sand, said composition comprising a crystalline solid unsaturated polyester having an acid value of 15 to 100 and being substantially tack-free at room temperature, said polyester being derived from (A) a dicarboxylic acid component containing 10 to 50 mole% of terephthalic acid, an alkyl terephthalate, isophthalic acid, or an alkyl isophthalate and 50 to 90 mole% of fumaric acid and (B) a glycol component containing at least 90 mole% of ethylene glycol, trimethylene glycol, neopentyl glycol, hydrogenated bisphenol A or 2,2-di-(4-hydroxypropoxyphenyl)propane.

DESCRIPTION OF THE PREFERRED EMBODIMENTS

In the production of the unsaturated polyester in accordance with this invention, 10 to 50 mole% of terephthalic acid, an alkyl terephthalate, isophthalic acid or an alkyl isophthalate and 90 to 50 mole% of fumaric acid are jointly used as the dicarboxylic acid component (A). When the amount of fumaric acid is less than 50 mole%, the resulting unsaturated polyester has insufficient crystallinity, and the resin composition is tacky at a temperature slightly higher than room temperature. Thus, sand particles in sand coated with this resin composition adhere to each other, and it is difficult to fill the coated sand particularly into a thin portion of a core in core molding. When the amount of the fumaric acid exceeds 90 mole%, coated sand obtained by coating sand particles with the resin composition has a slightly decreased hot strength, and a thin portion of a core is likely to be damaged at the time of removing a mold after molding of a foundry core.

In the production of the unsaturated polyester in accordance with this invention, the glycol component (B) containing at least 90 mole% of ethylene glycol, trimethylene glycol, neopentyl glycol, hydrogenated bisphenol A or 2,2-di(4-hydroxypropoxyphenyl)propane is used. If the amount of such a specified glycol is less than 90 mole%, the unsaturated polyester composition obtained becomes tacky in the summertime. Hence, sand particles in sand coated with this composition adhere to each other, and are difficult to fill in a thin portion of a core.

It is especially important in this invention that the aforesaid saturated dicarboxylic acid (i.e., terephthalic acid or isophthalic acid) or its alkyl ester and fumaric acid which is an unsaturated dicarboxylic acid should be used in the specified molar proportions. This requirement makes it possible to ensure full exhibition of the desirable properties of the crystalline unsaturated polyester resin composition and to achieve the object of this invention. An unsaturated polyester derived from the aforesaid saturated dicarboxylic acid or its alkyl ester and a glycol does not form a cured product with a copolymerizable unsaturated monomer or prepolymer. An unsaturated polyester derived from fumaric acid and a glycol has slightly lower strength and a high shrinkage, and is unsuitable for preparation of an unsaturated polyester resin composition for bonding of foundry sand, especially for making a large core having a thin portion.

The crystalline unsaturated polyester used in this invention is prepared by a known polymerization method. For example, it can be prepared by a one-step method which comprises simultaneously reacting the unsaturated dicarboxylic acid (fumaric acid), the saturated dicarboxylic acid (terephthalic acid, isophthalic acid or an alkyl ester thereof) and the glycol (e.g., ethylene glycol, etc.), or by a two-step method which comprises reacting the saturated dicarboxylic acid with the glycol, and then reacting the resulting product with the unsaturated dicarboxylic acid. Generally, the two-step method is preferred because unsaturated polyesters obtained by the one-step method have inferior flexural strength and a lower heat distortion temperature.

To control the rate of esterification in the production of the crystalline unsaturated polyester in this invention, a moderate amount of another saturated or unsaturated dicarboxylic acid may be additionally used together with the dicarboxylic acid component (A). Examples of such additional saturated dicarboxylic acids include phthalic acid, phthalic anhydride, adipic acid, sebacic acid, azelaic acid, naphthalene-1,4-dicarboxylic acid, naphthalene-1,5-dicarboxylic acid, endomethylenetetrahydrophthalic anhydride, tetrahydrophthalic anhydride, hexahydrophthalic anhydride, anthracenemaleic anhydride, and the adducts and substitution products thereof. Those having a symmetric molecular structure such as adipic acid are especially preferred in order to increase the degree of crystallization of the unsaturated polyester. Examples of such additional unsaturated dicarboxylic acids include mesaconic acid, citraconic acid, itaconic acid, citraconic anhydride, maleic acid, maleic anhydride, and the substitution products thereof. Those having a symmetric molecular structure, such as mesaconic acid, are especially preferred in order to increase the degree of crystallization of the unsaturated polyester.

The glycol component (B) used in the production of the crystalline unsaturated polyester in this invention may contain not more than 10 mole% of another glycol in addition to at least 90 mole% of ethylene glycol, trimethylene glycol, neopentyl glycol, hydrogenated bisphenol A or 2,2-di-(4-hydroxypropoxyphenyl)propane. Examples of the other glycol include propylene glycol, diethylene glycol, 1,4-butanediol, tetramethylene glycol, hexamethylene glycol, dipropylene glycol, triethylene glycol, 1,6-hexanediol, 1,3-butanediol, 2,3-butanediol, 1,5-pentanediol, 1,3-butylene glycol, meta-xylylene glycol, 2,3-bis[para-(hydroxyethoxy)-phenyl]-propane, 1,4-cyclohexanedimethanol, 2-ethyl-1,3-hexanediol, 2,2,4-trimethylpentanediol-1,3 and 2,2-dimethylpropanediol-1,3, and the substitution products of these.

The crystalline unsaturated polyester resin composition of this invention contains as a main ingredient the unsaturated polyester obtained by polymerizing the dicarboxylic acid component (A) and the glycol component (B). In order to improve its properties further, it is possible to add to the resin composition a copolymerizable unsaturated monomer, a copolymerizable prepolymer, a mixture of the monomer and the prepolymer, a catalyst, a silane coupling agent for increasing the interfacial adhesion strength between the composition and sand, etc.

Examples of the copolymerizable unsaturated monomer and prepolymer include styrene, divinylbenzene, vinyltoluene, α-methylstyrene, ethylene glycol dimethacrylate, diethylene glycol dimethacrylate, neopentyl glycol dimethacrylate, trimethylolpropane trimethacrylate, diallyl phthalate, diacetone acrylamide, N-methylol acrylamide, tetramethane tetramethacrylate, diallyl phthalate prepolymer, diallyl isophthalate, diacryl isophthalate prepolymer, trimethyacryl trimethylolpropane, N-vinylcarbazole, dimethacryl-1,3-butylene diallyl phthalate prepolymer, triallyl cyanurate, maleimide, triallyl isocyanurate, and triallyl trimellitate. At least one of these may be added in an amount of up to 130 parts by weight per 100 parts by weight of the unsaturated polyester.

Examples of the catalyst include tert-butyl peroxy-2-ethylhexanoate, benzoyl peroxide, tert-butyl peroxyisobutyrate, lauroyl peroxide, tert-butyl peroxylaurate, cyclohexanone peroxide, tert-butyl peroxybenzoate, di-tert-butyl diperoxyphthalate, 2,5-dimethyl(2,5-dibenzoylperoxy)hexane, dibumyl peroxide, tert-butylcumyl peroxide, tert-butyl hydroperoxide, di-tert-butyl peroxide, 1,3-bis-(tert-butyl peroxyisopropyl)benzene, and 1,1-bis-(tert-butylperoxy)-3,3,5-trimethylcyclohexane. At least one of these may be added in an amount of 0.1 to 10 parts by weight per 100 parts by weight of the unsaturated polyester.

Organosilicon compounds of the formula

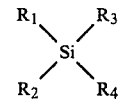

wherein $R_1$ represents an organic functional group containing at least one group selected from the class consisting of alkenyl, alkenylphenylalkyl, acryloxyalkyl, methacryloxyalkyl, glycidoxyalkyl, epoxycyclohexylalkyl, sulfhydrylalkyl, aminoalkyl and haloalkyl groups, and $R_2$, $R_3$ and $R_4$ each represents a hydrolyzable group selected from the class consisting of alkoxy groups, alkoxyethoxy groups, acetoxy group and halogen atoms, are preferred as the silane coupling agent. Specific examples of the silane coupling agent are γ-mercaptopropyltrimethoxysilane, γ-aminopropyltriethoxysilane, N-β-(aminoethyl)-γ-aminopropyltrimethoxysilane, γ-chloropropyltrimethoxysilane, vinyltrichlorosilane, β-(4-vinylphenyl)ethyl-trimethoxysilane, γ-(N,N-dimethylamino)-propyltriethoxysilane, γ-(N-methylamino)-propyltriethoxysilane, vinyltriethoxysilane, vinyltris-(β-methoxyethoxy)-silane, γ-methacryloxypropyltrimethoxysilane, β-(3,4-epoxycyclohexyl)ethyltrimethoxysilane, γ-glycidoxypropyltrimethoxysilane, and vinyl triacetoxysilane. At least one of them may be added in an amount of 0.05 to 10 parts by weight per 100 parts by weight of the unsaturated polyester.

An inorganic powder in ultrafine particles having a particle size of less than 0.5 microns may be added to the crystalline unsaturated polyester resin composition of this invention in order to promote its crystallization. Examples include silicic anhydride, aluminum silicate, magnesium silicate, calcium silicate, glass powder, calcium carbonate, clay, mica powder, calcium sulfate, barium sulfate, magnesium carbonate, barium carbonate, talc, diatomaceous earth, and quartz powder. Use of silicic anhydride or a silicate having a particle diameter of less than 0.1 micron is especially effective. Preferably, the inorganic powder may be added in an amount of 0.05 to 5 parts by weight per 100 parts by weight of the crystalline unsaturated polyester.

Waxes such as calcium stearate may be added in order to improve the flowability of sand particles coacted with the resin composition of this invention.

In order to perform the esterification step rapidly and precipitate crystals rapidly in the production of the unsaturated polyester in accordance with this invention, the materials are usually employed such that the mole ratio of the glycol component (B) to the dicarboxylic acid component (A) (the sum of the unsaturated dicarboxylic acid and the unsaturated dicarboxylic acid) is from 0.9 to 1.15.

The unsaturated polyester in the crystalline unsaturated polyester composition of this invention has an acid value of 15 to 100, preferably 20 to 90. A crystalline unsaturated polyester resin composition is difficult to obtain from an unsaturated polyester having an acid value of more than 100. On the other hand, a crystalline unsaturated polyester resin composition obtained from an unsaturated polyester having an acid value of less than 15 has a high melt viscosity, and it is difficult to coat sand uniformly with such a resin composition. Thus, no increase in the firing strength of the coated sand can be expected.

The following Example and Comparative Example illustrate the present invention specifically with reference to the accompanying drawing.

The drawing is a sectional view showing the state of pouring of an aluminum alloy (AC2A) in a mold made of $CO_2$-method foundry sand in a disintegrability test shown in the Example.

EXAMPLE

A four-necked flask equipped with a stirrer, a thermometer, a nitrogen gas inlet tube and a partial reflux-type condenser having a thermometer at a tower top was charged with fumaric acid, each of the saturated dicarboxylic acids shown in Table 1 and each of the glycols shown in Table 1, while the mole ratio of the glycol component to the dicarboxylic acid component was maintained at 1.05. They were esterified in a customary manner. Thus, unsaturated polyesters having acid values shown in Table 1 were obtained.

Each of these unsaturated polyesters was cooled to 140° C., and 100 parts by weight of the cooled unsaturated polyester was mixed with 8 parts by weight of diallyl phthalate, 2.5 parts by weight of γ-methacryloxypropyltrimethyl silane (A-174, a tradename for a product of Nippon Unicar Co., Ltd.) and 1.0 part by weight of silicic anhydride in ultrafine particles (Aerosil #200, a tradename for a product of Nippon Aerosil Co., Ltd.). The mixture was cooled to room temperature to crystallize and solidify the polyester, followed by pulverization to a size smaller than 10 mesh. Those which did not crystallize and solidify were used as such.

One thousand grams of Nikko silica sand #5 heated at 170° C. was put into a universal mixer-stirrer (5DWM, a tradename for a product of Shinagawa Kogyo Sho K.K.) and with stirring, 30 g of each of the samples obtained was added and mixed to melt adhere it to the surface of the sand. While maintaining the temperature of the sand at 70° to 90° C., a solution of 0.3 part by weight of cyclohexanone peroxide and 0.3 part by weight of tert-butyl hydroperoxide in 4 parts of acetone was mixed and dispersed to form coated sand.

The flexural strength of a molded product of the coated sand was measured in accordance with the method set forth in JIS K6910-1964 by the following procedures.

(1) A mold for making a test piece was preheated to 230° C., and the coated sand was filled into it. It was allowed to stand at 230° C. for 70 seconds to complete its hardening. The flexural strength (hot flexural strength) of the test piece was measured immediately then.

(2) After hardening in procedure (1) above, the test piece was removed immediately from the mold, and allowed to cool to room temperature. Then, the flexural strength (room temperature flexural strength) of the test piece was measured.

A disintegrability test was performed using the coated sand. A core was molded from the coated sand in a mold pre-heated to 220° C. The core was set in a mold made of the $CO_2$-method foundry sand as shown in FIG. 1. In FIG. 1, the reference numeral 1 represents the core having a diameter of 50 mm and a height of 30 mm; 2, molten aluminum; 3, a $CO_2$-method mold having a hole with a diameter of 10 mm; and 4, a discharge port having a diameter of 10 mm and a height of 10 mm. Molten aluminum alloy AC2A was poured at 690° C. to a height 10 mm above the core 1, and solidified and cooled. Then, the surrounding $CO_2$-method mold was broken, and the amount of the sand discharged from the discharge port for aluminum castings was measured by a ro-tap type sieving machine. Disintegration of the core and discharge of the sand were completed by performing the sieving operation for only 5 minutes. The operation was not preceded by baking of the casting.

The results are shown in Table 2.

COMPARATIVE EXAMPLE

Experiments were conducted in the same way as in Example except that the ratios of the starting materials for the unsaturated polyester were changed as shown in Table 1 (Runs Nos. 13, 19, 21 and 22); and that a phenol resin-coated sand in accordance with a prior technique (Run No. 20) was performed. The results are shown in Table 2.

In the disintegrability test, the phenol resin-coated sand in accordance with the prior technique was not at all discharged from the casting even while the sieving machine was operated continuously for 120 minutes. Even when the disintegration test was preceded by baking of the casting for 2 hours at 500° C., only a very small amount of the sand was discharged from the casting by continuing the operation of the sieving machine for 30 minutes.

TABLE 1

| | Proportions (mole %) of the materials for polyester | | | | | | | | | |
|---|---|---|---|---|---|---|---|---|---|---|
| | Saturated dicarboxylic acid | | Unsaturated dicarboxylic acid | Glycol | | | | | | |
| Run No. | Terephthalic acid | Isophthalic acid | Fumaric acid | Ethylene glycol | Trimethylene glycol | Neopentyl glycol | Hydrogenated bisphenol A | 2,2-di-(4-hydroxypropoxyphenyl)-propane | Propylene glycol | Acid value of the unsaturated polyester | Remarks |
| 1 | 20 | — | 80 | 95 | — | — | — | — | 5 | 40 | Invention |
| 2 | 20 | — | 80 | — | 95 | — | — | — | 5 | 40 | |
| 3 | 20 | — | 80 | — | — | 95 | — | — | 5 | 40 | |
| 4 | 20 | — | 80 | — | — | — | 95 | — | 5 | 40 | |
| 5 | 20 | — | 80 | — | — | — | — | 95 | 5 | 40 | |
| 6 | — | 20 | 80 | 95 | — | — | — | — | 5 | 40 | |
| 7 | — | 20 | 80 | — | 95 | — | — | — | 5 | 40 | |

TABLE 1-continued

| | Proportions (mole %) of the materials for polyester | | | | | | | | | |
|---|---|---|---|---|---|---|---|---|---|---|
| | Saturated dicarboxylic acid | | Unsaturated dicarboxylic acid | Glycol | | | | | | Acid value of the un- |
| Run No. | Tere-phthalic acid | Iso-phthalic acid | Fumaric acid | Ethylene glycol | Tri-methylene glycol | Neopentyl glycol | Hydrogenated bisphenol A | 2,2,di-(4-hydroxy-propoxy-phenyl)-propane | Propylene glycol | saturated polyester | Remarks |
| 8 | — | 20 | 80 | — | — | 95 | — | — | 5 | 40 | |
| 9 | — | 20 | 80 | — | — | — | 95 | — | 5 | 40 | |
| 10 | — | 20 | 80 | — | — | — | — | 95 | 5 | 40 | |
| 11 | 35 | — | 65 | 95 | — | — | — | — | 5 | 40 | |
| 12 | 45 | — | 55 | 95 | — | — | — | — | 5 | 40 | |
| 13 | 45 | — | 55 | 40 | — | 55 | — | — | 5 | 40 | Comparison |
| 14 | — | 35 | 65 | — | 45 | — | 52 | — | 3 | 40 | |
| 15 | 60 | — | 40 | 95 | — | — | — | — | 5 | 40 | |
| 16 | 5 | — | 95 | 95 | — | — | — | — | 5 | 40 | |
| 17 | — | 45 | 55 | 80 | — | — | — | — | 20 | 10 | |
| 18 | 35 | — | 65 | 95 | — | — | — | — | 5 | 120 | |
| 19 | 35 | — | 65 | 95 | — | — | — | — | 5 | 10 | |
| 20 | Prior-art technique (phenol resin-coated sand) | | | | | | | | | | |
| 21 | — | — | 100 | 95 | — | — | — | — | 5 | 40 | |
| 22 | 100 | — | — | 95 | — | — | — | — | 5 | 40 | |

TABLE 2

| Run No. | Flexural strength (kg/cm²) | | Crystallinity of the unsaturated polyester (*) | Disintegrability of the core (**) | Remarks |
|---|---|---|---|---|---|
| | Room temperature strength | Hot strength | | | |
| 1 | 64 | 35 | o | o | Invention |
| 2 | 68 | 41 | o | o | |
| 3 | 66 | 44 | o | o | |
| 4 | 66 | 38 | o | o | |
| 5 | 64 | 36 | o | o | |
| 6 | 65 | 35 | o | o | |
| 7 | 65 | 37 | o | o | |
| 8 | 66 | 38 | o | o | |
| 9 | 67 | 45 | o | o | |
| 10 | 65 | 41 | o | o | |
| 11 | 67 | 39 | o | o | |
| 12 | 60 | 35 | o | o | |
| 13 | 63 | 35 | x | o | Comparison |
| 14 | 63 | 42 | x | o | |
| 15 | 50 | 28 | x | o | |
| 16 | 51 | 32 | o | o | |
| 17 | 45 | 30 | x | o | |
| 18 | 52 | 29 | x | o | |
| 19 | 53 | 31 | o | o | |
| 20 | 57 | 52 | — | x | |
| 21 | 45 | 27 | o | o | |
| 22 | Not hardened | — | — | | |

Note
*: o - crystalline
x - not crystalline
**: o - wholly discharged
x - not discharged

What we claim is:

1. A composition for making cores or molds by bonding foundry sand which is obtained by mixing:
   (a) foundry sand;
   (b) an unsaturated polyester resin which is substantially tack-free at room temperature and has an acid value of 15 to 100, said unsaturated polyester resin being prepared by polymerizing.
   (1) a dicarboxylic acid component containing 10 to 50 mole% of terephthalic acid, an alkyl terephthalate, isophthalic acid or an alkyl isophthalate and 50 to 90 mole % of fumaric acid, and
   (2) a glycol component containing at least one of ethylene glycol, trimethylene glycol, neopentyl glycol, hydrogenated bisphenol A or 2,2-di-(4-hydroxypropoxyphenyl) propane, wherein said dicarboxylic acid component (1) and said glycol component (2) being polymerized in a (2)/(1) mole ratio of from 0.9 to 1.15; and
   (c) a catalyst, the amount of said catalyst being 0.1 to 10 parts by weight per 100 parts by weight of said unsaturated polyester.

2. The resin composition of claim 1, which further comprises 0.05 to 10 parts by weight, per 100 parts by weight of said unsaturated polyester, of a silane coupling agent.

3. The resin composition of claim 1, which further comprises 0.05 to 5 parts by weight, per 100 parts by weight of said unsaturated polyester, of an inorganic powder.

4. The resin composition of claim 1, which further comprises up to 130 parts by weight, per 100 parts by weight of said unsaturated polyester, of a copolymerizable unsaturated monomer or prepolymer.

* * * * *

UNITED STATES PATENT OFFICE
CERTIFICATE OF CORRECTION

Patent No. 4,417,011            Dated November 22, 1983

Inventor(s) Koue Ohkawa, Shin Fujii, and Takashi Seino

It is certified that error appears in the above-identified patent and that said Letters Patent are hereby corrected as shown below:

On the title page, Item [73] should read:

--[73] Assignee: Mitsui Toatsu Chemicals, Inc. Tokyo, Japan and Nissan Motor Co., Ltd, Kanagawa-ken, Japan--.

Signed and Sealed this

Eleventh Day of September 1984

[SEAL]

Attest:

GERALD J. MOSSINGHOFF

Attesting Officer

Commissioner of Patents and Trademarks